United States Patent [19]

Gerhard

[11] Patent Number: 4,505,402
[45] Date of Patent: Mar. 19, 1985

[54] FREIGHT CONTAINER AND CORNER FITTING THEREFOR

[75] Inventor: Helmut Gerhard, Weitefeld, Fed. Rep. of Germany

[73] Assignee: Westerwälder Eisenwerk Gerhard GmbH, Fed. Rep. of Germany

[21] Appl. No.: 505,408

[22] Filed: Jun. 17, 1983

[30] Foreign Application Priority Data

Jun. 18, 1982 [DE] Fed. Rep. of Germany ....... 3222763
Oct. 26, 1982 [DE] Fed. Rep. of Germany ....... 3239620

[51] Int. Cl.³ .............................................. B65D 88/00
[52] U.S. Cl. ....................................... 220/1.5; 217/65; 220/4 F; 220/71
[58] Field of Search ............... 217/65, 47, 69; 24/287; 220/1.5, 71, 4 F, 6, 7; 294/67 DA; 410/71; 403/363

[56] References Cited

U.S. PATENT DOCUMENTS

| 896,860 | 8/1908 | Segessemann | 217/47 |
|---|---|---|---|
| 1,277,864 | 9/1918 | Cochrane | 220/4 F |
| 1,322,962 | 11/1919 | Sessions | 220/4 F |
| 1,672,108 | 6/1928 | Winchell | 217/69 |
| 2,041,582 | 5/1936 | Wheeling | 217/47 |
| 2,340,545 | 2/1944 | Marsh | 217/65 X |
| 2,590,159 | 3/1952 | Davis | 217/65 |
| 2,823,821 | 2/1958 | Frater et al. | 220/4 F |
| 3,071,277 | 1/1963 | Olson et al. | 217/69 X |
| 3,221,921 | 12/1965 | Silverman | 220/1.5 X |
| 3,259,264 | 7/1966 | Best et al. | 217/65 X |
| 3,315,639 | 4/1967 | Close | 217/65 X |
| 3,404,444 | 10/1968 | Isbrandtsen | 24/287 |
| 3,919,603 | 11/1975 | Salvati et al. | 403/363 X |
| 4,214,669 | 7/1980 | McQuiston | 220/6 |

FOREIGN PATENT DOCUMENTS

| 383410 | 10/1923 | Fed. Rep. of Germany | 217/69 |
|---|---|---|---|
| 1152354 | 8/1963 | Fed. Rep. of Germany | 217/69 |
| 2942104 | 5/1981 | Fed. Rep. of Germany . | |
| 917142 | 12/1946 | France | 217/69 |

Primary Examiner—Stephen Marcus
Assistant Examiner—Robert Petrik
Attorney, Agent, or Firm—Barnes & Thornburg

[57] ABSTRACT

The corner portions of a small or medium freight container are formed by the respective three frame elements (31,32,33) of the container frame and by a corner fitting (30) welded thereto. The frame elements are hollow elements of essentially square cross-section. The corner fitting (30) is formed with a corner opening (24) which is dimensioned so that the clear cross-sections of the frame elements (31, 32, 33) are accessible as fork truck channels intended for the arms of a fork truck through the respective corner fitting. The edges of the corner fitting (30) and the frame elements (31, 32, 33) inserted into the edge regions of the corner fitting are formed with aligned corner holes (25, 26) used for insertion of a crane hook tip or for securing and latching of coupling or lashing elements.

17 Claims, 8 Drawing Figures

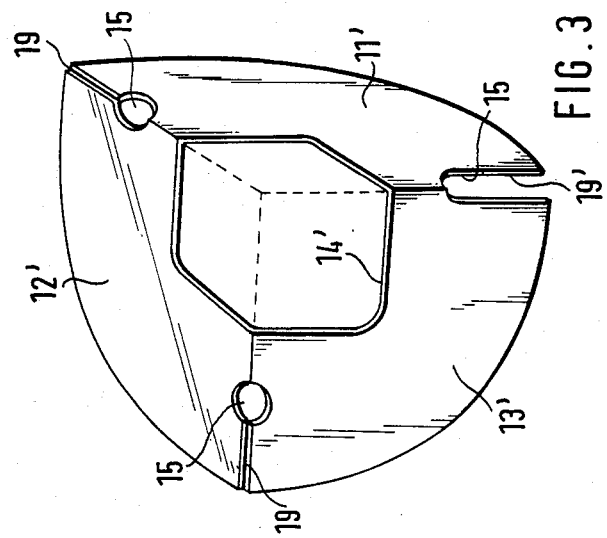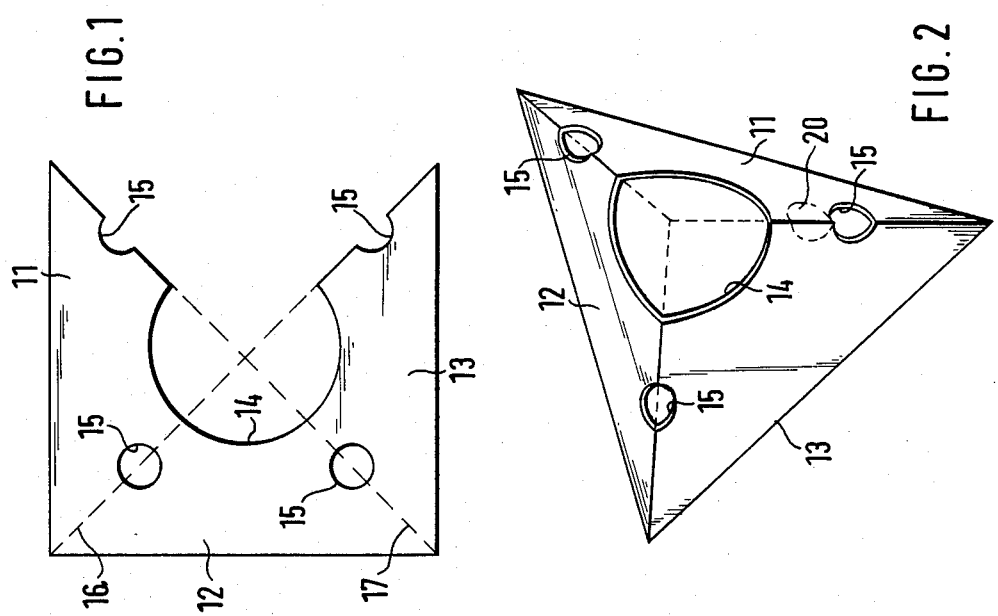

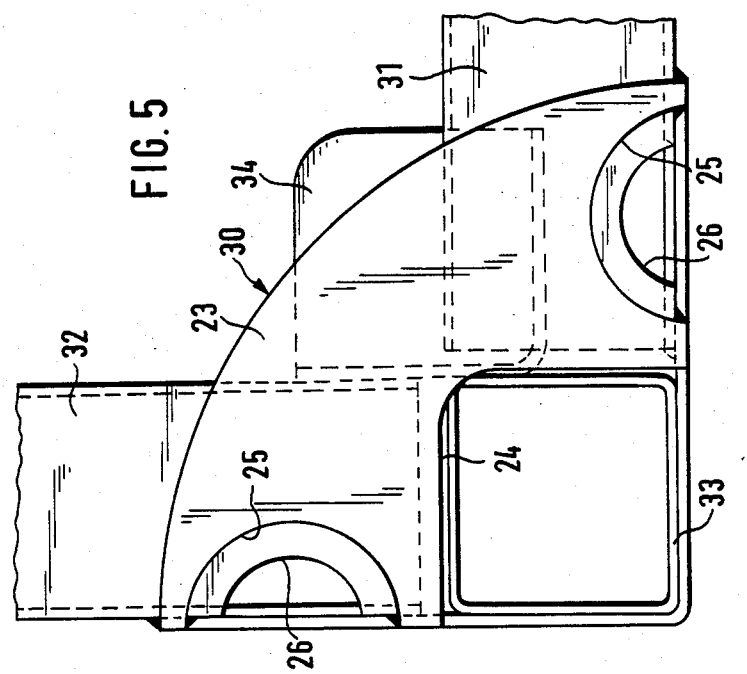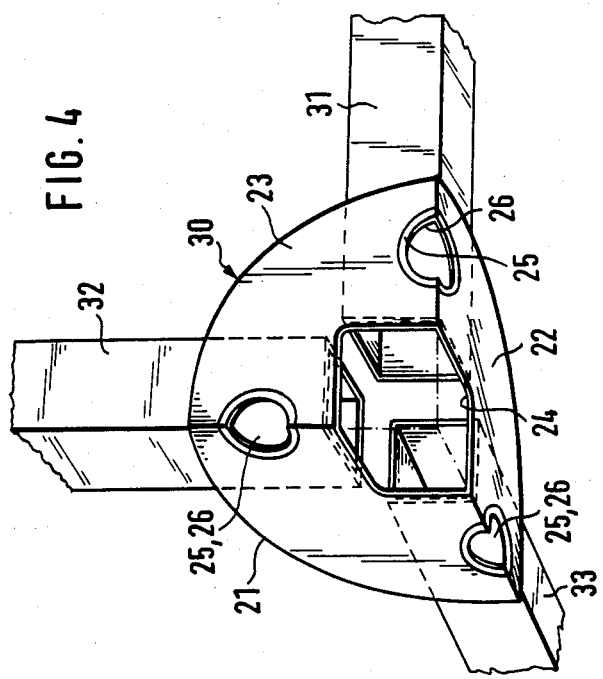

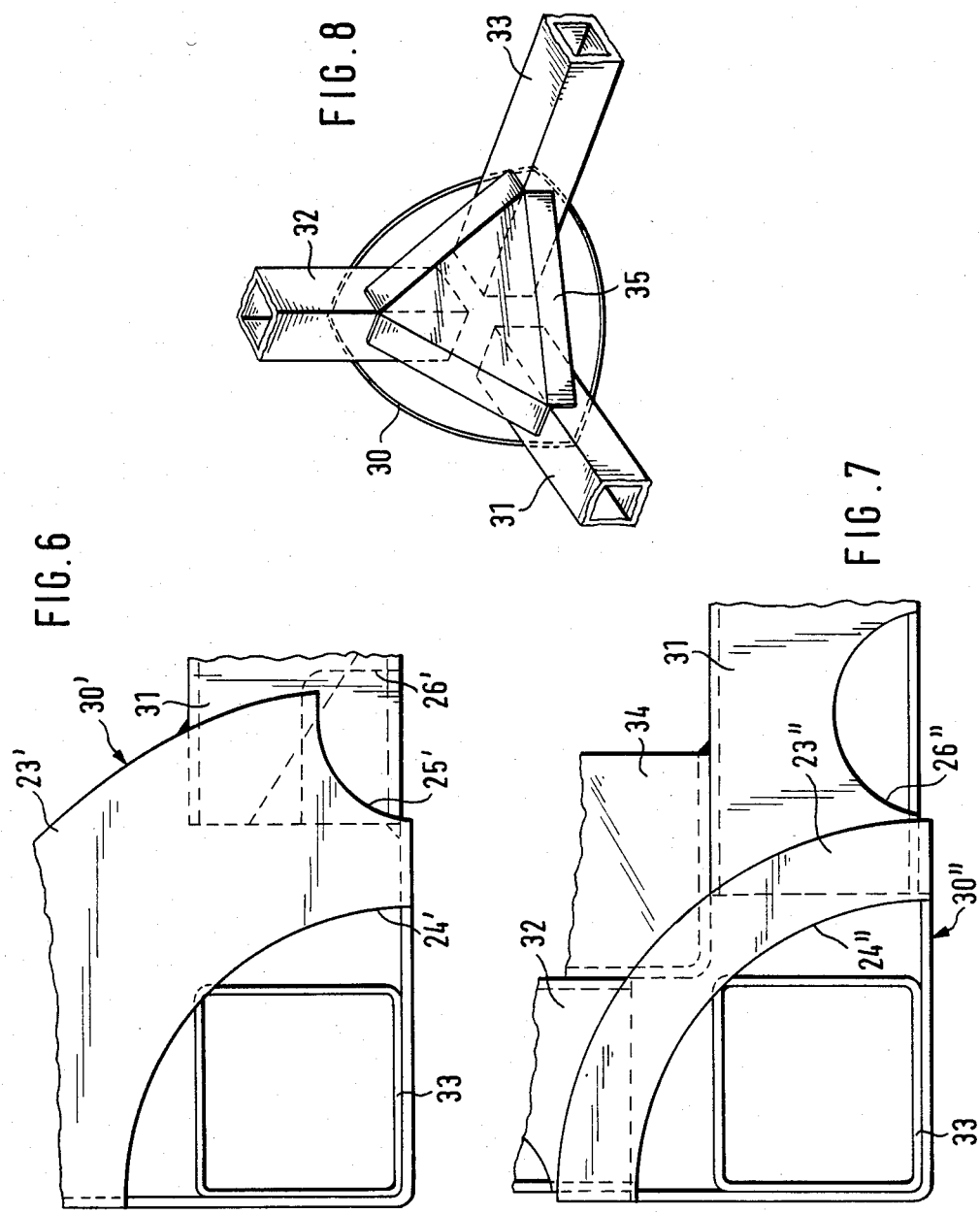

FREIGHT CONTAINER AND CORNER FITTING THEREFOR

The invention relates to a corner fitting for a freight container and to a freight container equipped with such corner fittings.

A corner fitting is described in European Patent Application Publication No. 54881, which relates especially to the making of the corner fitting from a flat blank. Among other things it is described therein in what way a corner fitting may be made by edge-forming operations from a circular or square blank formed with a central circular or square opening, in which corner fitting two quadrants of the blank overlap each other thereby forming a surface of the corner fitting. In one embodiment thereof, the opening is formed merely by a cut in the corner portion facing away from the container so that an outwardly extending bent beak-like projection results on this corner, and beneath said projection a hole is formed in the same edge, through which the tip of a crane hook, which is inserted behind the projection, may exit. For the rest, the walls of the corner fitting according to the earlier patent application are formed with holes which—as in the conventional corner fitting according to ISO Standard No. 1161—are used for inserting special means used for the lateral coupling of adjacent containers.

In order to enable manipulation of containers by means of fork trucks it is usual to provide channels for insertion of the truck arms at the container bottom between the corner fittings. On the one hand, such channels reduce the useful volume available inside of the space defined by the corner fittings; on the other hand, they require additional structural elements which increase the manufacturing costs and the weight of the container.

It is an object of the invention to provide a corner fitting and a freight container including such corner fitting, which while being of even simpler structure may be universally used for all eight corners of a container and also allows a still simpler coupling between adjacent containers both laterally and vertically with an accompanying improvement in rigidity and safety, and which further permits handling of the container by fork-lift trucks without any additional structural elements. The benefits provided by the earlier container corner, especially the possibility of inserting crane attachments in the three typical diagonal directions, as well as the reliable retaining of a crane hook inserted into the corner fitting against inadvertent detachment due to cable slackness, are to be retained.

To meet with this object, the corner fitting of this invention comprises three wall members defining a cube corner, a corner opening common to all three of said wall members, and three edge holes each being common to a pair of adjacent wall members, said corner opening and said three edge holes being disposed substantially symmetrically to a body diagonal extending through said corner opening.

Accordingly, the edge holes which are provided in all three edges of the corner fitting, in conjunction with the corner opening common to all three walls of the cube corner and the symmetrical design relative to the body diagonal of the corner fitting, permit the use of one and the same corner fitting for all eight corners of the container so as to readily couple both stacked and side-by-side containers by the insertion of pairs of pins into the facing corner openings of the corner fittings, which are disposed either in side-by-side or vertically stacked relationship, which pairs of pins are then connected to each other in the region of the corner openings and also in the region of the then also adjacent edge holes. Due to the fact that the edge portions of the corner fittings have high dimensional stability, a particularly safe coupling is obtained. The same advantage of high stability is utilized upon insertion of a crane hook which—in contrast to earlier solutions—applies its load to an edge portion instead of an area portion of the corner fitting.

In a preferred embodiment of the invention, the corner opening is dimensioned so as to leave free the clear openings of the section elements which are inserted into the corner fitting and form the edges of a container frame. The section elements may thus be used directly for receiving the arms of a fork-lift truck or for receiving coupling rods which may penetrate through section elements of a number of containers placed one behind the other.

In another embodiment, each of the three edges of the corner fitting is formed with a slot which extends from the corner facing away from the said corner opening. Each slot may extend up to the respective edge hole, and it may be confined by straight lines tangential to the respective edge hole and extending parallel to the respective edge. These features result in the benefit that the corner edge elements may be inserted without play into the corner fitting and welded thereto even if they have sharp edges. At the same time, additional welding may be performed from the outer edge, which is particularly advantageous with respect to a reliable joining of the corner fitting in case of round cross-section container edge elements.

In another embodiment of the invention, the edge portions provided between the corner opening and the edge holes are reinforced, the reinforcement preferably being formed by punchings which are at least partially cut from the edge holes and are optionally folded inwardly. Sufficient strength of the remaining bearing surfaces is thus ensured even in case of relatively small dimensions of the corner fitting.

The freight container according to the present invention comprises section elements forming a container frame, at least one pair of the section elements being configured as open-ended fork-lift channels, and corner fittings joined to the ends of said section elements, each corner fitting including three wall members defining the respective corner and commonly forming a corner opening which is dimensioned so as to leave free the clear opening of each fork-lift channel, each section element terminating outside the extensions of said clear openings of the respective other fork-lift channels. In this freight container, again the section elements constituting the container frame are themselves used as fork-lift channels, and the corner fittings were three respective section elements meet are so designed that the fork-lift channels which have open-end faces, are accessible through the corner fittings. When all section elements are formed as fork-lift channels, such a container may be received on the arms of a fork-lift truck from any of its four sides and in any position, i.e. in the horizontal position, standing-up and upended.

In a preferred embodiment, the section elements are hollow-section elements with substantially square or circular cross-section. This concept offers the advantge of increased flexural strength as compared to the flat cross-sections of conventional fork-lift channels. Alternatively, section elements of L-shaped cross-section may be employed, wherein only the respective upper two section elements of a container may be used as fork-lift channels.

In another embodiment, the corner opening forms a square in each of the respective three wall members of the corner fitting, the corner of said square opposite the outer corner of the fitting being formed with a radius. This results in the advantage, that the corner fittings present as much area as possible for welding of the section elements while offering maximum utilization of the corner opening. The rounded corners of the corner opening are in favour of close pressing and locking of inserted cranke hooks upon application of diagonal tension. In case each of the three wall members of the corner fitting has the shape of a quarter circle, the centres of the circles coinciding in the outer corner of the fitting, in accordance with another advantageous embodiment of the inventon, the corner fittings present relatively large surfaces for joining to the container edge elements.

In another embodiment, the end portions of the section elements are each formed with a cut-out in the edge defining an outer edge of the container frame. The openings of the corner fittings, which are suitable to receive the tip of a crane hook or other coupling elements, are thus positioned in the dimensionally particularly stable edge portions. Particular strength of these openings under loads is achieved by disposing cut-outs in the edges of the corner fittings substantially in alignment with cut-outs of the respective section elements. The edge holes formed by these cut-outs in the corner fittings may be further used advantgeously for receiving pins or hooks which are either inserted into the ends of fork-lift arms or may be fixedly connected thereto, whereby a reliable retaining of the arms of the fork-lift truck is achieved even in case these arms—like upper hooks of container side spreaders—are inserted only over a short distance into the corner fittings and section elements.

In a further embodiment, an attachment fitting joins the ends of the section elements at locations facing away from the respective corner fitting, and each attachment fitting may be formed by that piece of material of a corner fitting which is obtained by cutting-out the corner opening. This results in an additional reinforcement of the container corner area by utilizing the trimmings obtained in the fabrication of the corner fittings. A particularly good reinforcement is achieved, in accordance with still another preferred embodiment, by forming the attachment fittings as substantially plane pieces which extend generally transversely to the body diagonal of each corner fitting and are joined to inner faces of the respective section elements of the container frame.

Preferred embodiments of the invention will be described in detail with reference to the accompanying drawing, in which FIG. 1 shows a blank for forming a corner fitting for cargo containers;

FIG. 2 shows the corner fitting formed from the blank shown in FIG. 1;

FIG. 3 shows a modification of a finished corner fitting;

FIG. 4 is a perspective view of the section elements forming a container corner and welded to a corner fitting;

FIG. 5 is a side view of the arrangement shown in FIG. 4;

FIGS. 6 and 7 are modifications of the arrangements shown in FIG. 5; and

FIG. 8 is a perspective view of a container corner shown from inside to illustrate a further embodiment of an attachment fitting.

The blank shown in FIG. 1 for a corner fitting is formed by three equal-sided right-angled triangles 11, 12 and 13 which are joined in such a way that their hypotenuses define three sides of a square. This blank is provided with a circular opening 14 having its centre in the point of intersection of the diagonals. Furthermore, a circular hole 15 is provided between the circular opening 14 and each corner of the square, the centre of said hole being located on the respective diagonal. As the blank has the overall configuration of a square with one quarter-surface missing, the central opening 14 also corresponds only to a three-quarter circle, and two of the holes 15 are correspondingly only semicircular.

When the blank shown in FIG. 1 is bent at right angles about the diagonal lines 16 and 17, the corner fitting having the shape of FIG. 2 will result, wherein the two legs of the omitted triangle of the blank join one another and are welded to each other.

Instead of forming the corner fitting in this way from a bent flat blank it is also possible to make the corner fitting shown in FIG. 2 by steel-casting, deep drawing or a similar process, wherein the corner opening 14 and the three edge holes 15 shown in FIG. 2 will then be provided subsequently.

Instead of being formed as a triangular pyramid as shown in FIG. 2, the corner fitting may also be formed of three 90 degrees circular ring segments 11', 12', 13' as shown in FIG. 3. This configuration may also be made of a flat blank by edge-forming and welding or by steel-casting or by another process.

The corner fitting shown in FIG. 3 has on each edge a slot 19 extending from the outermost corner of the corner fitting along each edge to the hole 15. When the container edge elements, which are not shown in the drawing, are inserted into the corner fitting, the slots 19 ensure that both faces of said edge elements are in even engagement on the inner faces of the corner fitting without any play therebetween and may be welded thereto even if the outer edges of said edge elements are relatively sharp. If the slots 19 were not provided, engagement on either face would not be possible because of the rounded-in corners or fillets always present in fittings which are made by edgeforming, casting or in any other way. Furthermore, it is possible on account of the slot 19 to secure the edge element inserted into the corner fitting from its outer edge with an additional weld to the corner fitting, which will be especially advantageous when the container edge elements have round or externally radiused cross-section.

The slots 19 may also be provided in the corner fitting according to FIG. 2. (not shown explicitly therein). Also, as shown for example at 19' in FIG. 3 for the lower vertical edge, the slots may be so wide that their confining lines are tangential to the corresponding edge hole 15. As further explained below in connection with FIG. 6, the corner fitting may in this case be manufactured at a minimum of material and weight.

The shape of the corner opening 14' shown in FIG. 3 has been modified over that of FIGS. 1 and 2. The description of FIG. 4 will explain the reason for this shape, which is formed by substantially square cut-outs lying in each wall member, each cut-out having a radius opposite to the outer corner of the fitting.

When the corner fitting as shown in FIG. 2 or FIG. 3 is made by edge-forming and welding, the slot 19 or 19' in the edge where the blank is welded may be produced simply by effecting the welding operation only up to the edge hole 15. In that case the other two slots are punched out just as the edge holes 15 while the blank is in its flat state.

On the finished container, the corner opening 14 is used, for instance, for inserting a crane hook whose tip exits through one of the edge holes 15. In the case of normal crane attachments such crane hooks will hook into all four upper corner fittings of a container, wherein the tips of the crane hooks exit through the edge holes 15 formed in the vertically downwardly extending edges. From the crane hooks the cables extend to a common location approximately centrally above the container. When the container is set down, the cables will slacken, whereupon the crane hooks have the tendency to turn further into the corner opening 14; thereby the hooks will be prevented from detaching themselves.

Due to this way of manipulation the edge portion between the corner opening 14 and the edge hole 15 is subjected to particular loads, and it should therefore suitably be reinforced. This reinforcement may be provided by the punching which was punched out of the edge hole 15. Instead of being completely punched out, the punching may also remain joined to the side facing the corner opening 14 and may be folded inwardly and welded to that location, which is indicated at 20 in FIG. 2.

The ¾ circular configuration shown in the drawing for the corner opening 14 offers the advantage of presenting a somewhat flatter working angle for the crane hook, thus centring the same in the diagonal.

While the purely tetrahedral configuration of the corner fitting according to FIG. 2 offers the advantage of allowing maximum edge lengths with a minimum of weight and material, the embodiment according to FIG. 3, where the corner fitting is composed of three 90 degrees circular ring segments, is advantageous in a certain way because the support faces for the edge elements of the container have been somewhat enlarged.

When containers are stacked or set side by side, the respective adjacent corner fittings may be readily coupled by means of pairs of pins inserted through the corner openings 14, said pairs of pins being then connected to one another through the adjacent edge holes 15. Since these edge holes 15 define backsettings relative to the remaining profile of the containers or corner fittings, respectively, they offer good engagement upon quick-lashing either with or without the corner opening 14. By securing a shackle through the corner opening 14, which shackle protrudes behind the respective edge hole 15, it is easy to obtain a lashing secured by gravity.

FIGS. 4 and 5 show the structural members forming a left-hand bottom corner area of a cargo container, said members including a corner fitting 30, three section elements 31, 32, 33 which constitute three parts of a container frame and extend perpendicularly to each other, and an attachment fitting 34 (shown only in FIG. 5) reinforcing the corner fitting. As explained above, the corner fitting comprises three wall members 21, 22, 23 which extend perpendicularly to each other and together define a corner opening 24. The corner fitting 30 may be made according to FIG. 1, from a flat blank by edge-forming and welding or by pressing, drawing or any other forming process. The attachment fitting 34 is that piece of material which is obtained on cutting the corner opening 24 from the corner fitting 30. Each of the three edges of the corner fitting 30 further is provided with an edge hole 25 cut out of two adjacent wall elements.

The three section elements 31, 32, 33 are inserted into the edge portions of the corner fitting 30 to such an extent as to terminate shortly before the corner opening 24. Each of said section elements is in turn provided with an edge hole 26 substantially in alignment with the corresponding edge hole 25 of the corner fitting 30. In this position the section elements 31, 32, 33 are welded to the corner fitting 30 at the locations indicated in FIG. 5. The attachment fitting 34 is disposed such that its two vertical side faces partially engage the vertical inner faces of the section elements 31 and 33 and are also welded thereto. If required, the joint between the attachment fitting 34 and the vertical section element 32 may be effected through an additional member (not shown in the drawing). If the relatively adjacent vertically extending edges of the attachment fitting 34 and of the vertical section element 32 are not excessively radiused, both members may also be directly welded at these edges.

The section elements 31, 32, 33 are designed as hollow section elements having substantially square cross-section. The corner opening 24 of the corner fitting 30 is formed by three substantially square cutouts disposed in the individual wall members 21, 22, 23, wherein the corner of each cutout facing away from the common corner is radiused. These square faces are somewhat larger than the clear cross-section of the section elements 31, 32, 33, so that the section elements may be used as fork-truck channels and their full cross-section is accessible through the corner opening 24. The outer shape of the three wall members 21, 22, 23 forming the corner fitting 30 respectively corresponds to the quadrant of a circle, the centres of the circles coinciding in the (imaginary) corner of the corner fitting 30.

When all eight corners of a container are set up in accordance with the illustration shown in FIGS. 4 and 5, the container may be lifted by means of a fork truck in any desired position and from any side, because the truck arms may be inserted in any of the three directions through any corner fitting into the truck channel formed by the respective section element 31, 32, 33. On account of the square cross-sections of the truck channels, which are provided for reasons of symmetry, it is advantageous when the truck arms or fork tines, respectively, also have square cross-section. As compared to the normally flat tine cross-sections this is beneficial because of the increased flexural strength.

To manipulate the container by means of a fork-lift truck, the truck arms may be inserted into the two lower or the two upper corner fittings and the section elements provided behind the same to a correspondingly great distance. Instead thereof it is also possible to insert two substantially shorter fork arms or ram attachments into the two upper corner fittings and section elements to a relatively short length and to secure them by retention pins which are inserted through the edge holes 25, 26 into corresponding recesses in the truck arms or which are fixedly secured at an appropriate spacing from the arms at the truck-side end of the arms. Further, it is also possible to insert comparatively short ram attachments into all four corner fittings facing the fork truck and into the section elements disposed behind the same, wherein also in this case side spreaders are employed. In that case the friction of the four ram attachments within the four section elements will provide for an even more reliable retaining of the container on the fork truck.

Finally, parallel coupling rods may be fed through the lower corner fittings and mutually aligned hollow-section elements of a plurality of containers disposed in a row behind each other. Such a coupled unit could be placed on axle units without requiring a platform or chassis. The saving in weight achieved by this concept is apparent.

Instead of the section elements shown in FIGS. 4 and 5, which have substantially square hollow section, it is also possible to employ those having circular hollow section. In this case also the arms or tines of the fork truck or side spreader, respectively, should have circular cross-section, as is known for manipulating paper rolls or the like.

Furthermore it is also possible to use L-section elements as elements 31, 32, 33, which are disposed in the usual manner so that their edges form the outer edges of the container frame. In that case only those section elements may be used as truck channels which in the respective container position are the upper section elements.

To lift the container by means of crane hooks, the hook is inserted through the corner opening 24 in such a way that its tip will exit through that edge hole 25, 26 which is positioned in the direction of tension of the crane cable. The radiused shape shown in FIGS. 4 and 5 of the corner opening 24, which for the rest is formed by square faces, causes that portion of the crane hook which is adjacent the point of contact of the cable to press close into the rounded portion, whereby it is centred in a position in which it is secured against dropping when the cable is slack.

Upon coupling of containers which are either in side-by-side relationship or stacked upon each other it is possible to insert coupling elements through the corner openings 24 or through the edge holes 25, 26 of the respective directly adjacent corner fittings 30 of the two containers, wherein these coupling elements may be additionally secured through the respective other holes or openings.

The embodiment according to FIG. 6 differs from that according to FIGS. 4 and 5 in that the corner opening 24' is defined by three quarter circles whose radius is substantially equal to the diagonal of the interior cross-section of the section elements 31, 32, 33. The wall members, of which FIG. 6 shows particularly the wall member 23, are reduced to a relatively narrow ring which extends only to a portion of the edge holes 26 formed in the section elements 31, 32. In these edge regions the corner fitting according to FIG. 6 is provided with edge cutouts 25'.

Whereas in the corner fitting 30 according to FIGS. 4 and 5 the edge holes 25, 26 are each defined as a semi-circle in the two contiguous wall members (wherein the edge hole 25 formed in the corner fitting is somewhat larger than the edge hole 26 in the section elements in order to accommodate tolerances in the mutual alignment), it is also possible to define the edge hole 26' in the section elements by a right-angled or inclined cutout as indicated in dashed lines in FIG. 6. With a view to modes of fabrication, a straight cutout extending across the edge of the section element is particularly advantageous.

FIG. 6 does not show an attachment fitting. Furthermore, the section elements are inserted into the corner fitting 30' only to a short distance. This configuration of the container corner therefore requires little material and is of lightweight construction, which may be useful and beneficial in the case of small containers.

In the further modification shown in FIG. 7, the wall members of the corner fitting 30" have an even more reduced width of material. In this case the corner fitting terminates outside of the edge holes 26" provided in the section elements 31, 32, 33. To increase the rigidity or strength, an attachment fitting 34 is again provided, which in this case is inserted in such a way that its vertical surface, which faces the viewer, engages the wall member 23" and is welded thereto, whereas the other two surfaces of the attachment fitting 34 are welded to the top surface of the section element 31 and the inner right-hand surface of the section element 32, respectively. In that case a joint between attachment fitting 34 and the third section element 33 may again be provided by means of an additional structural member (not shown).

FIG. 8 shows a different attachment fitting 35, which consists substantially of an equal-sided flat plane member including bent trapezoidal portions on all three sides. The equal-sided area of the triangle extends substantially perpendicularly to the body diagonal of the container corner defined by the three section elements 31, 32, 33. The trapezoidal portions are bent opposite to the equal-sided area towards the corner so that their side edges engage the inner faces of the section elements 31, 32, 33 and are welded thereto. With the attachment fitting 35 it is possible to achieve a uniform and reliable bracing relative to all three section elements.

The design characteristics described above for the three embodiments shown in the drawing may be varied in accordance with requirements. Thus, an attachment fitting may also be used in the embodiment shown in FIG. 6. In each case the attachment fitting may be designed in accordance with FIGS. 5 and 7 or FIG. 8. Furthermore, in all cases the corner fitting may be formed of triangular or even square wall elements instead of the quadrants of a circle as shown. Similarly, the corner opening 24 of the corner fitting may in each case be formed of square cutouts with a radiused corner according to FIGS. 4 or 5, or of quarter-circle shaped cutouts according to FIGS. 6 and 7, or even of triangular cutouts.

1. A corner fitting for a freight container comprising three mutually perpendicular wall members defining three sides of a cube corner,
   a corner opening means common to all three of said wall members for accommodating fork lift members for handling said container, and
   three edge hole means each being common to a pair of adjacent wall members for accommodating, in conjunction with said corner opening means, hooks for handling said container,
   said corner opening and said three edge holes being disposed substantially symmetrically to a container body diagonal extending through said corner opening.

2. A corner fitting as claimed in claim 1, wherein said corner opening is dimensioned so as to leave free the clear openings of section elements which are inserted into the corner fitting and form the edges of said container frame.

3. A corner fitting as claimed in claim 1, wherein said wall members mutually intersect to form three edges of said cube corner, and wherein each of said edges is formed with a slot which extends from the corner facing away from said corner opening.

4. A corner fitting as claimed in claim 3, wherein said slots extend up to said edge holes.

5. A corner fitting as claimed in claim 3, wherein each of said slots is confined by straight lines tangential to the respective edge hole and extending parallel to the respective edge.

6. A corner fitting as claimed in claim 1, wherein reinforced edge portions are provided between said corner opening and said edge holes.

7. A corner fitting as claimed in claim 6, wherein each reinforcement is formed by a punching cut from one of said edge holes.

8. A freight container comprising
frame elements forming a container frame, at least one pair of said frame elements each having interior surfaces forming a fork lift channel engageable by fork lift means for handling said freight container, said interior surfaces being accessible through open ends of said frame elements,
corner fittings joined to the ends of said frame elements, each corner fitting including three wall members defining the respective corner and commonly forming a corner opening which is dimensioned so as to leave freely accessible the open ends of each frame element having a fork-lift channel, each frame element terminating outside the extensions of said open ends of the respective other fork-lift channels.

9. A freight container as claimed in claim 8, wherein said frame elements are hollow-section elements with substantially square cross-section.

10. A freight container as claimed in claim 8, wherein said frame elements are of L-shaped cross-section, the edges thereof forming the outer edges of said container.

11. A freight container as claimed in claim 8, wherein said corner opening forms a square in each of the respective three wall members of the corner fitting, the corner of said square opposite to the outer corner of the corner fitting being formed with a radius.

12. A freight container as claimed in claim 8, wherein each of said three wall members of the corner fitting has the shape of a quarter circle, the centres of the circles coinciding in the outer corner of the corner fitting.

13. A freight container as claimed in claim 8, wherein the end portions of said frame elements each are formed with a cutout in the edge defining an outer edge of said container frame.

14. A freight container as claimed in claim 13, wherein the edges of the corner fittings each are provided with a cutout substantially in alignment with said cutout of the respective frame element.

15. A freight container as claimed in claim 8, including an attachment fitting which joins the ends of said frame elements at locations facing away from the respective corner fitting.

16. A freight container as claimed in claim 15, wherein said attachment fitting is the piece of material of a corner fitting obtained upon cutting of said corner opening.

17. A freight container as claimed in claim 15, wherein said attachment fitting is a substantially plane piece which extends generally transversely to the body diagonal of said corner fitting and is joined to inner faces of said frame elements.

* * * * *